United States Patent [19]
Brown

[11] 3,829,199
[45] Aug. 13, 1974

[54] DISPOSABLE DENTAL MIRROR

[75] Inventor: Frank E. Brown, Glendale, Calif.

[73] Assignee: Minnesota Mining and Manufacturing Company, St. Paul, Minn.

[22] Filed: Jan. 18, 1972

[21] Appl. No.: 218,722

[52] U.S. Cl............... 350/308, 32/69, 128/10
[51] Int. Cl...... G02b 5/08, A61c 3/00, A61c 19/00
[58] Field of Search........ 350/308, 309; 128/10, 11; 32/69; 351/118

[56] References Cited
UNITED STATES PATENTS

| | | | |
|---|---|---|---|
| 1,695,451 | 12/1928 | Campbell | 350/308 X |
| 1,909,853 | 5/1933 | Dalton | 350/308 |
| 3,118,962 | 1/1964 | Hammond | 351/118 |
| 3,512,259 | 5/1970 | Gordon et al. | 350/308 X |
| 3,566,474 | 3/1971 | Zuhlke et al. | 350/308 X |

Primary Examiner—Paul A. Sacher
Attorney, Agent, or Firm—Kinney, Alexander, Sell, Steldt & Delahunt

[57] ABSTRACT

A disposable dental mirror comprises a plastic base adapted to hold a mirror thereon, the base having on its back side a receiving aperture to provide a removable frictional attachment between the base and a stem from a conventional dental mirror handle; and a mirror attached to the front surface of the base. The disposable mirror greatly minimizes cross-contamination between patients as it is inexpensive and may be conveniently discarded after use.

1 Claim, 8 Drawing Figures

PATENTED AUG 13 1974　　　　　　　　　　　　3,829,199
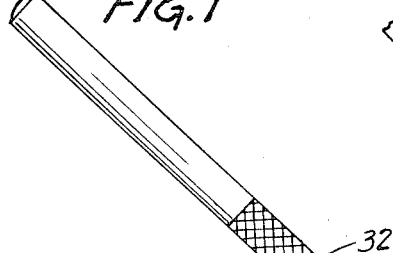
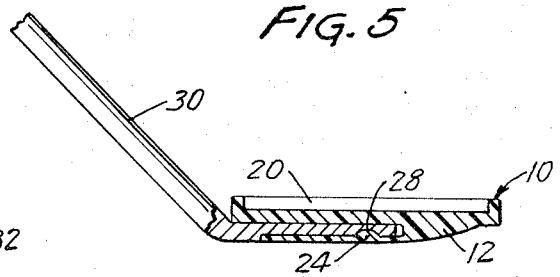
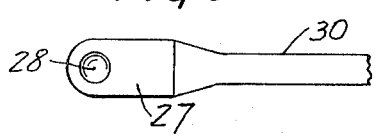
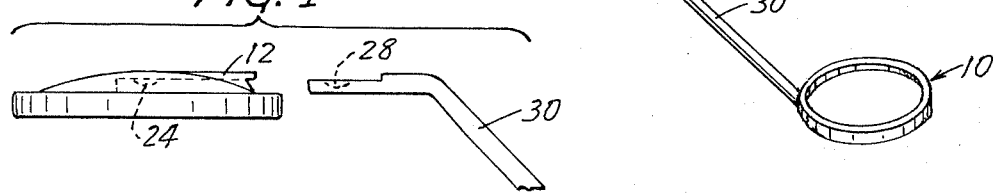
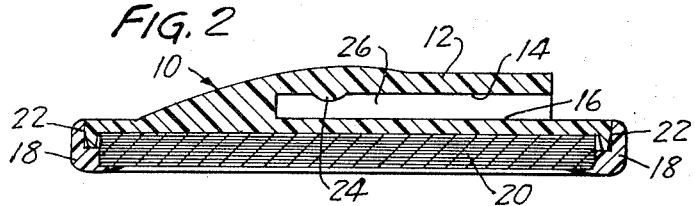
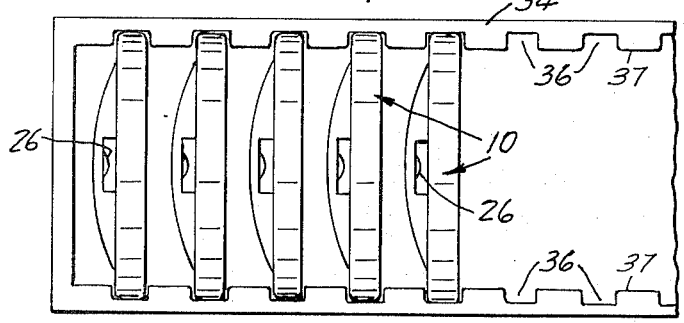
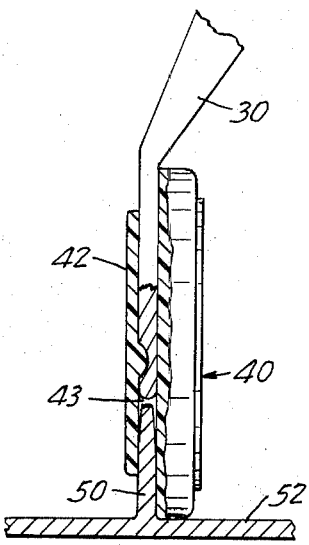
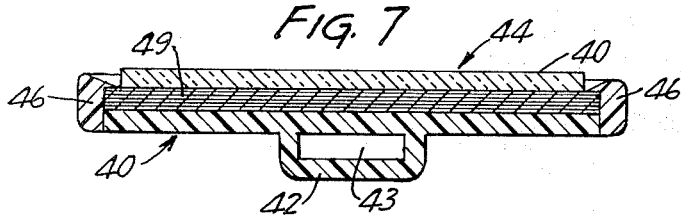

DISPOSABLE DENTAL MIRROR

BACKGROUND OF THE INVENTION

According to the present invention, there is provided a disposable dental mirror which is adapted to fit onto a conventional dental mirror handle, the mirror being inexpensive and convenient to manufacture such that it may be discarded after a single use, thus greatly minimizing the chances of cross-contamination between patients and also providing a chill-free contacting surface in the patient's mouth because of the plastic characteristics of the disposable mirror. More particularly, a disposable dental mirror is provided which comprises a plastic base adapted to hold the mirror on a front surface thereof and having attachment means on the back surface thereof to removably connect the base with the stem of a conventional dental mirror handle, the attachment means essentially comprising a receiving aperture integrally formed with the base such that the stem may be inserted into the receiving aperture to provide a removable friction attachment between the base and the stem. The actual reflecting mirror portion is preferably bonded to the front surface of the base by means of a retaining portion integrally formed with and around the periphery of the base and sonically welded thereto or by a separate retaining disk or ring adapted to snap over the mirror and onto the base, or adapted to be threaded onto the base, thereby holding the mirror to the base.

In the general practice of dentistry, the conventional dental mirror, which comprises a metal handle and a metal disk portion on the end of the handle, that disk portion holding a mirror, has been used for many years. The dental mirror is, of course, used to provide the dentist with a view of certain areas in the mouth in which he is working, which view would be otherwise unavailable to him. One problem that exists, however, is cross-contamination between patients. Most often, the same dental mirror is used for each patient and is not disinfected or sterilized between patients. Another problem that exists is that if the mirror is scratched by the dentist's drill, he must either use it in its damaged condition or purchase a new mirror, which is quite expensive. Also, metal based mirrors tend to become fogged when in the mouth.

Attempts to solve the above-noted problems have been generally unsuccessful. For example, U.S. Pat. No. 3,031,930 discloses a replaceable back surface, mirror and holders. That mirror comprises a magnetic material on the base and on the back of the mirror such that the mirror is held to the base by the magnetic attraction therebetween. An aperture in the base is provided such that a pick may be inserted into said aperture pushing the mirror away from the base, thereby breaking the magnetic attraction and allowing replacement of the mirror when it becomes scratched or otherwise damaged. This method is quite cumbersome and does still not eliminate the problems of cross-contamination with organisms because only the reflecting surface is exchanged while the metal base holding that surface remains. Further, metal-backed dental mirrors tend to become fogged up in the mouth, thereby reducing visability. Also, electric discharge in the mouth is quite common with metal-backed dental mirrors which is quite uncomfortable when a tooth is sensitive. Other such attempts are disclosed in U.S. Pat. Nos. 516,092, 1,909,853, and 3,512,259. None of these patents, however, disclose the unitary mirror concept whereby the entire mirror portion of the total dental mirror may be discarded after use, thus essentially eliminating cross-contamination between patients and eliminating the other problems recited heretofore.

SUMMARY OF THE INVENTION

The disposable mirror of the present invention comprises essentially a plastic base adapted to hold a mirror on a front side and having attachment means on the back side thereof to removably connect the base with the stem or foot of a dental mirror handle, the attachment means comprising a receiving aperture integrally formed with the base such that the stem may be inserted into the receiving aperture to provide a removable frictional attachment between the base and the stem, the base further having mirror retaining means around the periphery thereof and integrally formed therewith projecting generally from the front of the base; and a mirror attached to the base on the front surface thereof and at least partially held thereon by retaining means. In another embodiment, the mirror retaining means may be separate from the base and may comprise a retaining disk which is adapted to snap onto the base over the mirror, thereby holding the mirror to the base by frictional means. The plastic disposable mirror has the advantages of essentially eliminating cross-contamination between patients and may be conveniently discarded after a single use, and, because of the plastic character of the mirror, does not present a cold surface to sensitive tissues in the patient's mouth, eliminates painful electrical discharge in the mouth, and does not become fogged in the mouth.

The invention will be better understood with reference to the drawing wherein:

FIG. 1 is a perspective view of the dental mirror of the present invention attached to a conventional dental mirror handle;

FIG. 2 is a detailed cross section of the mirror of the present invention;

FIG. 3 is a bottom view of a modified stem;

FIG. 4 is a partial cross section of the mirror which is telescoped from the stem to show the relationship therebetween;

FIG. 5 is a cross section of the dental mirror wherein the stem is inserted into the receiving aperture;

FIG. 6 is a cut-away view showing the packaging system for the mirror of the present invention;

FIG. 7 is a cross section of the dental mirror wherein the receiving aperture extends entirely through the base; and FIG. 8 illustrates a means of packaging the mirror of FIG. 7.

Referring now to FIG. 1, the conventional dental mirror combination usually comprises a handle 32, a shank or stem 30 and a mirror 10. The shank or stem 30 may be removable from the handle or may be rigidly affixed thereto. According to the preferred embodiment of the present invention, as illustrated in FIG. 2, the mirror of the present invention 10 generally comprises a base 12 having a receiving aperture 26 therein, the receiving aperture having the projection 24 on one wall 14 thereof. This projection 24 could also be on the other wall 16, it only being necessary to place the indentation 28 on the other side of the stem. Mirror retaining means or retaining disk 18 is provided around a periphery of the dental mirror to hold the reflecting mirror portion 20 to the base 12. The retaining means 20 may be integrally formed with the base 12 or may be a separate member. The retaining disk 18 is preferably welded at point 22 to the remainder of the base 12 by sonic welding which is a process well known in the art. The retaining means, however, may be bonded to the remainder of the base by other well known means, such as snapping or threading the retaining disk over the base or by nontoxic adhesives. Thus, the mirror is actually held at the base surface and mechanically locked thereto by the retaining means. The retaining means in this instance is a combination of the base 12 sonically welded at 22 to the rim 18, locking the mirror 20 into place.

The stem 30 may be adapted or modified such as illustrated in FIG. 3 and as also illustrated in FIGS. 4 and 5. The end of the stem is adapted to have a relatively flat surface 24 with an indentation 28 therein. The indentation 28 is adapted to correspond and fit snugly with a projection 24 located within the receiving aperture 26 of the mirror to assist in frictionally holding the mirror on the stem. When the stem 30 is inserted into the receiving area 26 of the mirror, that receiving area, having an inner diameter only slighly larger than the outer diameter of the stem, the indentation 28 in the stem and the projection 24 in the base of the mirror coincide to aid in the frictional attachment between the mirror and stem as illustrated in FIG. 4.

A convenient means of packaging, storing and shipping the dental mirrors of the present invention is illustrated in FIG. 6. A plurality of dental mirrors 10 are held within a frame 34 by fitting the edges of the mirror into slots 36 separated by small protrusions 37. The mirrors are removably held within the frame and thereafter may be simply removed when desired by probing with the dental handle and stem into the receiving aperture 26 on the back of the mirrors until the handle is securely attached to the receiving aperture on the mirror. The mirror may be then conveniently removed directly from the frame without being touched by a dentist or nurse. Although the mirrors are not necessarily sterile when packaged, this kind of packaging aspect assures that aseptic procedures are followed.

In another embodiment of the invention, as illustrated in FIGS. 7 and 8, the dental mirror 40 has a receiving aperture 43 which runs entirely through the attachment means 42, such that the mirror may be attached to a mounting post 50 which is in turn attached to a base strip 52 for packaging purposes. The same principle for removing the mirror from the package is used as described heretofore and the mirror conveniently removed from the post 50 by inserting the stem 30 into the aperture 43 until firmly, frictionally held therein.

The most notable advantage of the mirror of the present invention is that it is inexpensive because of its plastic construction and may be conveniently discarded after use. This feature is extremely valuable to dentists as they can use a clean, semi-sterile dental mirror for each patient, and can replace the mirror assembly when they scratch the mirror when using their drill. Further, a plastic protected mirror affords a comfortable, nonchill feeling to the mouth, which is not found in the prior art metal-backed mirrors. The plastic protected mirror also protects the patient from electric discharge, also common with metal-backed mirrors, avoiding a shock to a sensitive tooth. Even further, the plastic protected mirror is less prone to become fogged, primarily due to the fact that the plastic-glass combination adjusts to heat changes more quickly than does the metal-backed mirror.

The mirror may be any of the well known mirrors in the art, for example, glass, plastic or vapor-coated metalized film. Also, the mirror could be a molded, one-piece construction (including the base and reflective mirror portion) rather than a two- or three-part construction as illustrated. The plastic base can be made of polyethylene.

Where a one-piece construction is employed, the front surface of the plastic base is vapor coated with a reflective material, such as metal. An example of a metal which could be used is aluminum. Most preferred, however, is a rhodium vapor-coat because it provides a very good reflective surface. The advantage of this embodiment is that the entire mirror may be molded and thereafter vapor coated, thereby eliminating the need for a separate mirror and retaining means therefor.

What is claimed is:

1. A dental mirror comprising a shank having a mirror releasably attached at one end thereof, said mirror comprising a base having a peripheral portion of generally circular shape, said base having an upper reflecting surface and having means defining a passage having a non-circular cross-sectional configuration extending thereinto beneath said reflecting surface and opening into the peripheral portion of said base, said shank having an end portion thereof with a non-circular cross sectional configuration substantially identical to the cross sectional configuration of said passage and being removably received in said passage, said end portion and the means on said base forming said passage having cooperating means separably interlocking said mirror and said shank to one another, said separably interlocking means comprising a cooperating projection and indentation.

* * * * *